(No Model.) 4 Sheets—Sheet 1.
W. TAYLOR.
BAND CUTTER AND FEEDER FOR THRASHING MACHINES.
No. 523,183. Patented July 17, 1894.
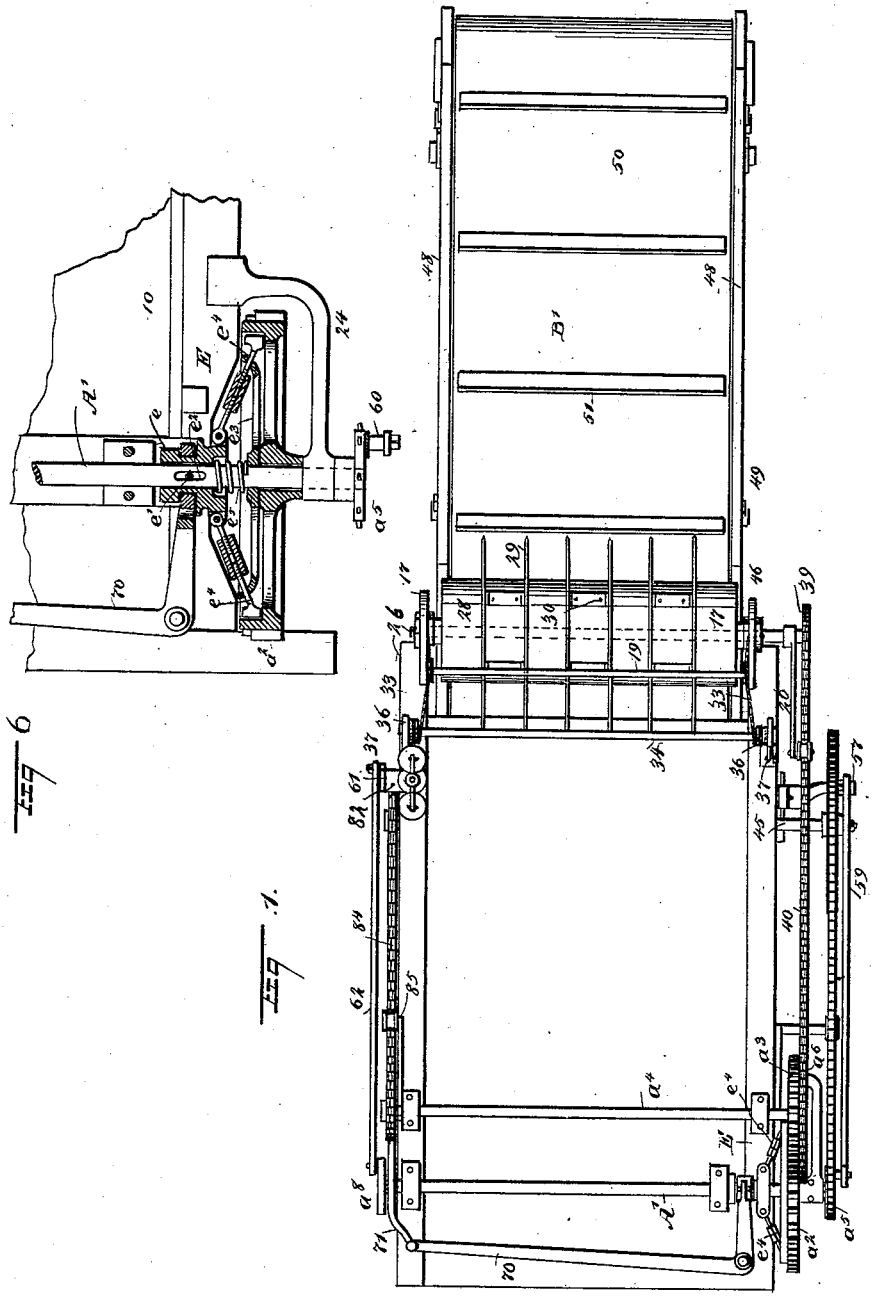
WITNESSES:
H. Walker
C. Sedgwick
INVENTOR
W. Taylor
BY
Munn & Co
ATTORNEYS.

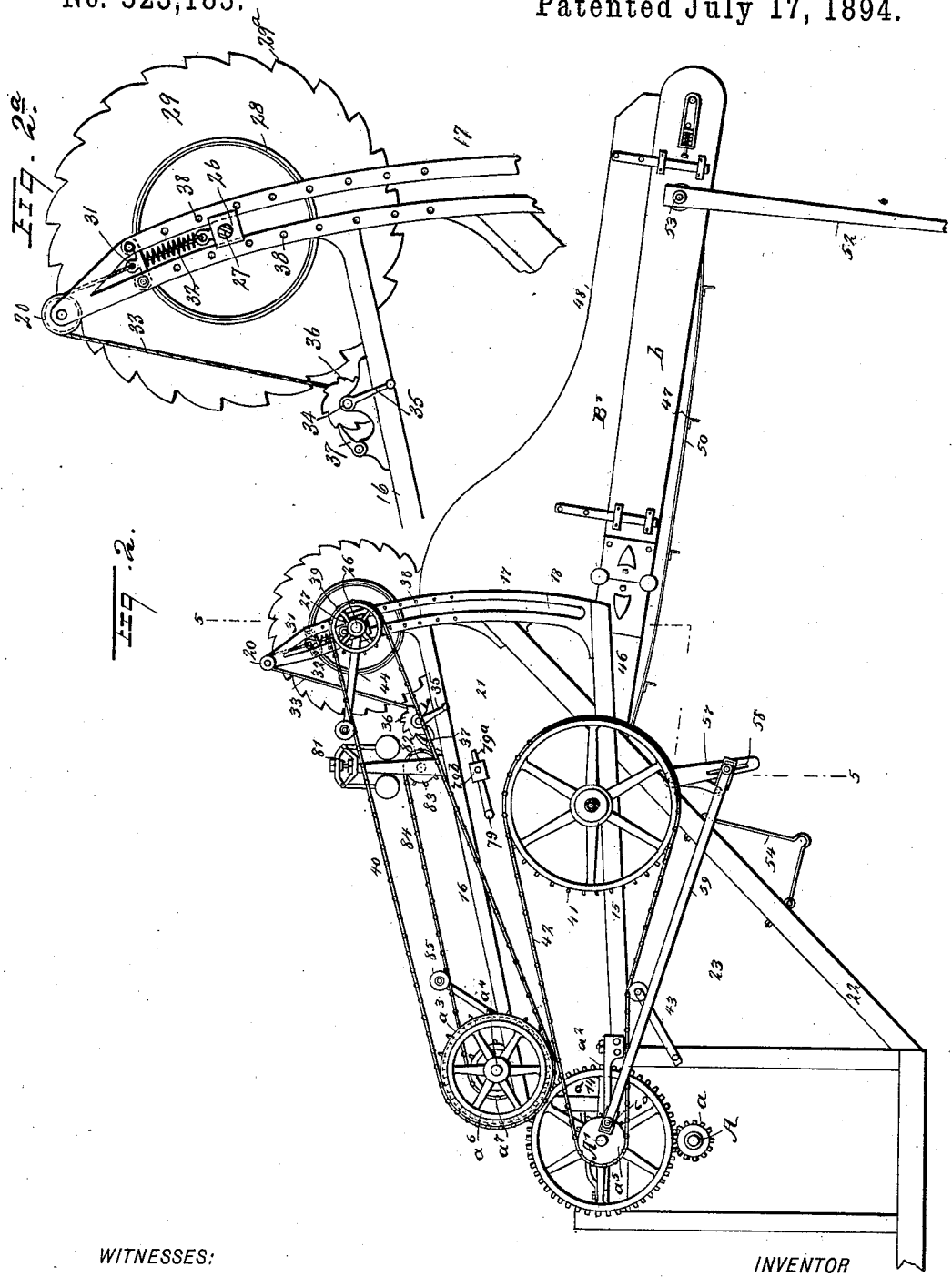

(No Model.) 4 Sheets—Sheet 3.
W. TAYLOR.
BAND CUTTER AND FEEDER FOR THRASHING MACHINES.
No. 523,183. Patented July 17, 1894.
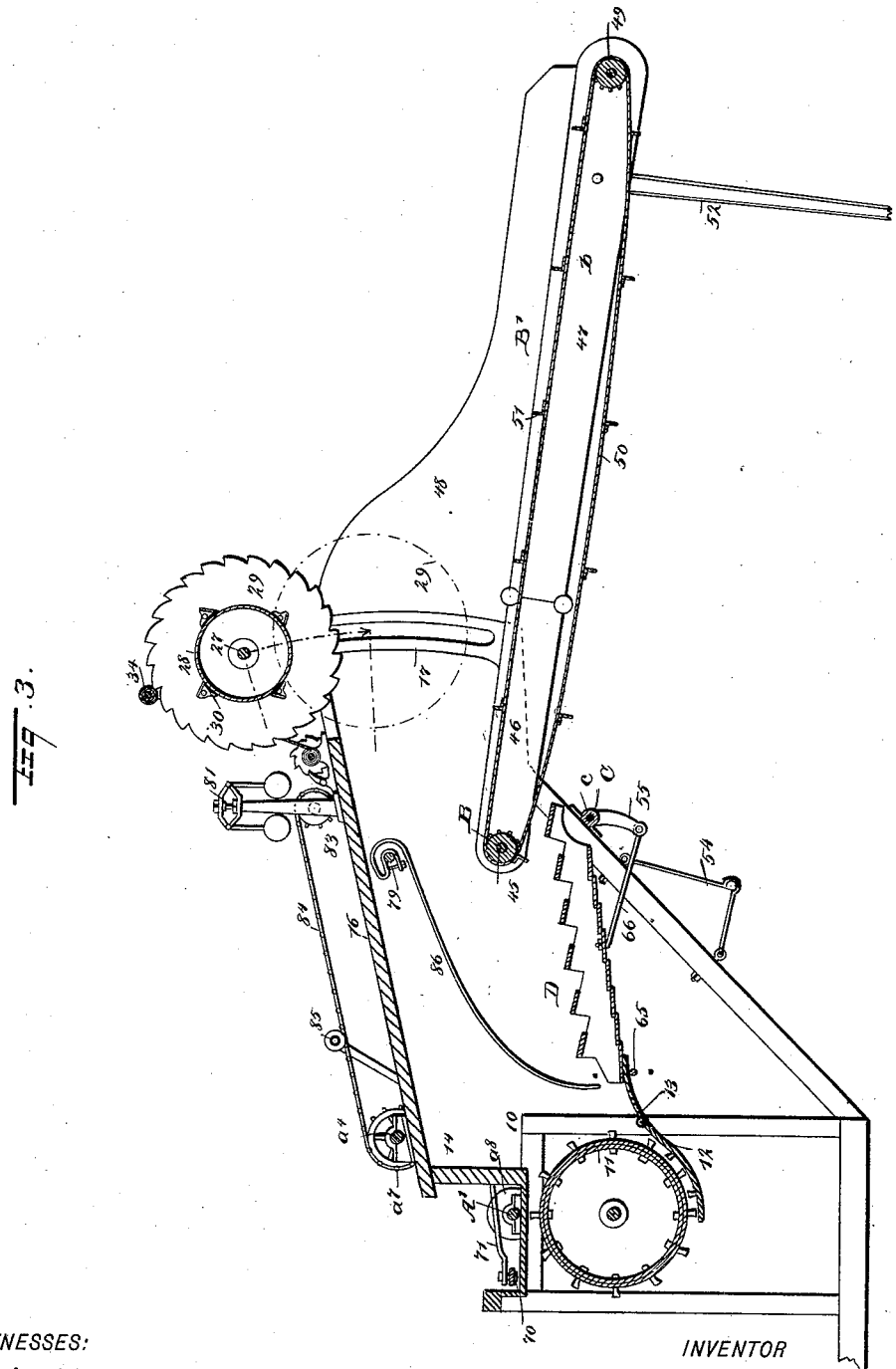
WITNESSES:
H. Walker
C. Sedgwick
INVENTOR
W. Taylor
BY
Munn & Co.
ATTORNEYS.

(No Model.) 4 Sheets—Sheet 4.
W. TAYLOR.
BAND CUTTER AND FEEDER FOR THRASHING MACHINES.
No. 523,183. Patented July 17, 1894.
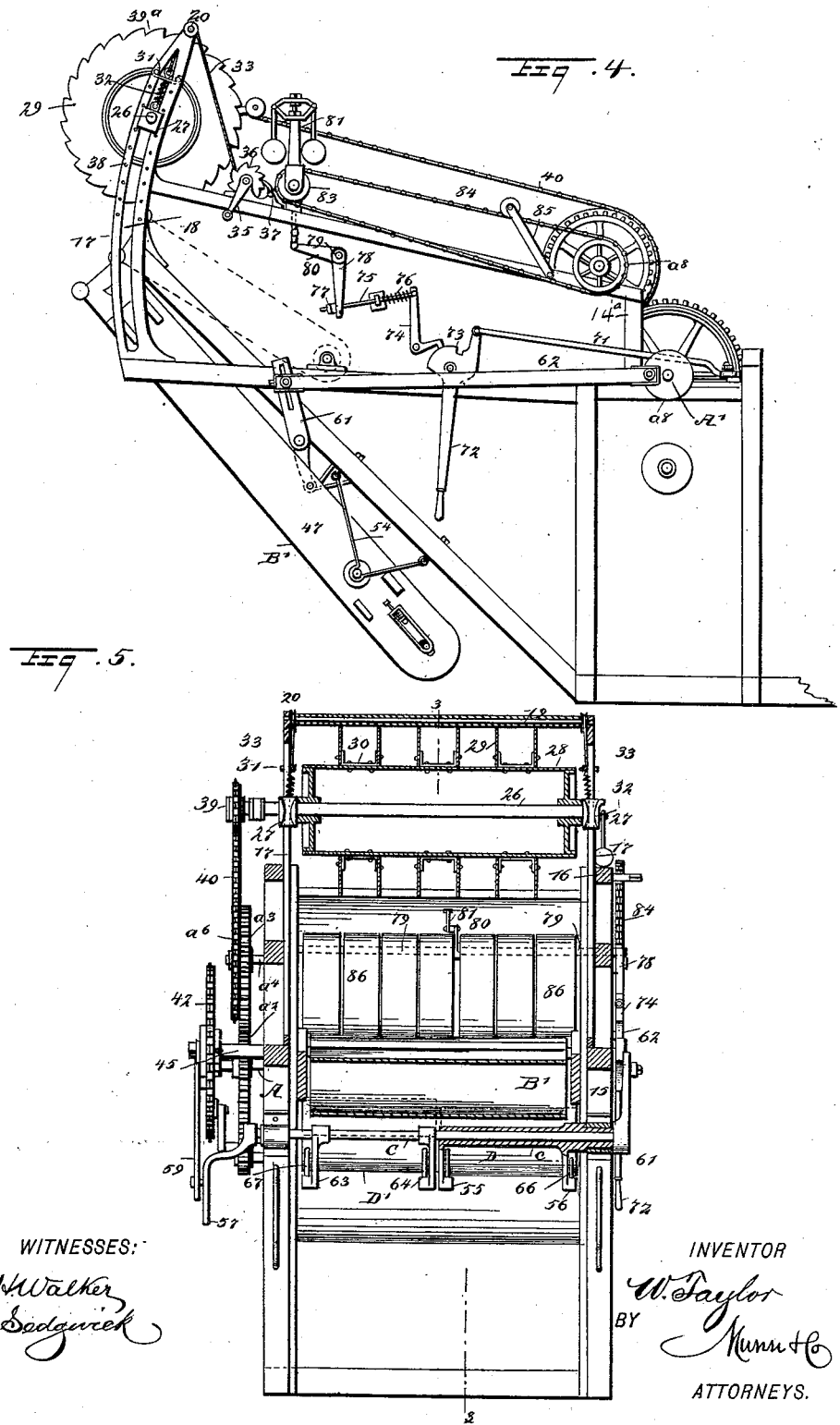
WITNESSES:
H. Walker
C. Sedgwick
INVENTOR
W. Taylor
BY
Munn & Co
ATTORNEYS.

UNITED STATES PATENT OFFICE.

WILLIAM TAYLOR, OF CARMAN, CANADA.

BAND-CUTTER AND FEEDER FOR THRASHING-MACHINES.

SPECIFICATION forming part of Letters Patent No. 523,183, dated July 17, 1894.

Application filed March 23, 1893. Serial No. 467,327. (No model.)

*To all whom it may concern:*

Be it known that I, WILLIAM TAYLOR, of Carman, in the Province of Manitoba and Dominion of Canada, have invented a new and useful Improvement in Band-Cutters and Feeders for Thrashing-Machines, of which the following is a full, clear, and exact description.

My invention relates to an improvement in band cutters and feeders for thrashing machines, and it has for its object to provide a device of that description capable of being expeditiously and conveniently attached to any form of thrashing machine, and provide a means whereby the band cutter may be adjusted expeditiously, conveniently, and positively to or from the feed belt or conveyer, in order that the attachment may be used in connection with grain of various kinds.

Another object of the invention is to provide a means whereby when the thrasher is not in use the conveyer of the attachment may be folded downward beneath the forward end of the thrasher and be locked in that position out of the way of the tram.

It is another object of the invention to provide a governor in connection with the attachment, which will automatically act to stop the machine the moment that the speed has dropped below a predetermined degree, and thus prevent the machine from being clogged, and insuring a uniform feed to the thrasher.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1 is a plan view of the attachment. Fig. 2 is a view of the left-hand side of the machine. Fig. 2ª is an enlarged side view—partly in section—of the cutters and mechanism for raising and lowering them. Fig. 3 is a vertical longitudinal section taken practically on the line 3—3 of Fig. 5. Fig. 4 is a view of the right-hand side of the attachment. Fig. 5 is a vertical transverse section taken essentially on the line 5—5 of Fig. 2; and Fig. 6 is a detail view of the clutch mechanism, the clutch being in section.

The attachment may be made to any thrashing machine or separator by simply taking away the front board, side arms, feed board and cap of the cylinder, and attaching to the frame of the separator or thrasher in front of the cylinder the frame of the attachment.

In Fig. 3 of the drawings a portion of the frame 10 of the separator or thrasher is illustrated, in which is contained the thrashing or separating cylinder 11 and the concave 12, the concave being provided at its outer end with a lip or extension 13, hinged to it in such manner that the lip may be raised and lowered.

On the top of the frame 10 a slight extension 14, is made, and the frame of the attachment may be said to consist essentially of two side bars 15, which are secured to the frame 10 near its upper end, the beams or bars 15 being essentially horizontal; and from the beams 10 an upright 14ª, is projected, and this upright has secured to it the top board or shed of the frame. The side beams of the shed or top board, together with the outer ends of the beams or sills 15, are secured to segmental or curved metal guides 17, the lower ends of the guides being secured to the lower sills 15. The metal guides 17, extend upward beyond the shed or top board 16, and are curved in direction of the thrasher or separator, said guides being provided with a longitudinal curved slot 18, extending practically from end to end, and the two guides at their upper ends are connected by a rod 19, as shown in Fig. 1, the said rod inside of the guides being provided with guide pulleys 20. The space between the shed or top board 16 and the side lower beams 15 of the frame is inclosed by a side cover 21 of any approved formation, either of metal or of wood; and the frame of the attachment may be said to consist further of side beams 22, which are attached to the guides 17 between the side sills 15 and the shed or top board 16, and at their lower ends the beams 22, are attached to the lower portion of the frame 10 of the separator or thrasher below the concave 12. Thus the beams 22, are diagonally located with respect to what may be termed the body of the attachment frame; and the space between the diagonal beams 22 and the base sills 15 of the body frame is inclosed by a siding 23 of any approved character.

The cylinder shaft A, is provided at one end, preferably at the left hand end, with a pinion $a$, which pinion meshes with a drive wheel $a^2$, loosely mounted upon the drive shaft A', journaled in suitable bearings upon the upper portion of the frame 10. A bracket 24, as shown in Fig. 6, is preferably utilized to support the outer end of the drive shaft A' in front of the driving wheel $a^2$. The driving wheel $a^2$, meshes with a gear $a^3$, which gear is secured upon a line shaft $a^4$, parallel with the driving shaft A', the line shaft $a^4$ being journaled in suitable bearings located upon the side beams of the top of the body frame, as shown in Fig. 1. On the left-hand extremity of the driving shaft A', a small sprocket wheel $a^5$ is secured upon said shaft, and a larger sprocket wheel $a^6$, is secured upon the left-hand end of the line shaft $a^4$, outside of the gear $a^3$, while at the opposite end of the line shaft $a^4$ a small sprocket wheel $a^7$, is secured, and a crank disk $a^8$, is attached to the corresponding end of the drive shaft A', the sprocket wheel $a^7$ and the crank disk $a^8$ being upon the right-hand side of the machine.

In the slot 18 of the guides 17 boxes 26, are held to slide; and in these boxes the ends of a cutter shaft 27, are journaled. The cutter shaft is adapted to carry cutters, the purpose of which cutters is to sever the ties of the bundles and cut the grain in suitable lengths.

The preferred construction of the cutters is as follows: A drum 28, is firmly secured upon the cutter shaft 26, as shown best in Fig. 5, and this drum extends practically from one bearing 27 to the other. Upon the drum a series of disk cutters 29, are securely fastened at proper and preferably equal distances apart, and the attachment of the cutters to the drum is usually effected by producing openings in the disk cutters through which the drum may pass, the cutters fitting snugly upon the drum, and each two opposing disks are connected by angle brackets or stay irons 30, the said angle brackets or stay irons being shown as somewhat of a U pattern, and their body portions are bolted or otherwise secured to the cylinder, while their end members are in like manner attached to the disk. Thus as the shafts 26 are revolved the cutters are revolved also. The disk cutters are provided with teeth $29^a$ upon their peripheral surface, the teeth being so shaped that the disks have somewhat the appearance of circular saws; but the teeth instead of having a purely triangular formation have their upper longer edges somewhat curved, as is fully shown in Figs. 2, 3 and 4.

It is desirable that the cutter shaft should be raised and lowered, and that the adjustment of the shaft should be accomplished in a very simple yet expeditious manner. Such an adjustment has been provided, and consists in connecting with each box 26 a cross-head 31, the heads being connected with the boxes through the medium of springs 32. Each head has attached to its central portion a chain or cable 33, and these chains or cables are passed up over the guide pulleys 20 upon the guides 17, and thence downward to a connection with a shaft 34, journaled in front of the guides 17 upon the top 16 of the body frame of the attachment, as shown in Figs. 1, 2 and 4. This shaft is turned preferably by means of a crank arm 35, which is located ordinarily at the left hand end of the shaft, as illustrated in Fig. 2; and near each end of the shaft a ratchet wheel 36, is located, engaged by pawls 37, the pawls serving as detents to prevent the shaft from turning after the cables or chains 33, have been wound around it to raise the shaft to the desired height.

In order that the weight of the cutter shaft and cutters shall not be entirely sustained by the chains or cables 33, the heads 31, connected with the shaft boxes 26 are provided at their ends with eyes, or the equivalents thereof, adapted to receive pins, as shown in Figs. 2 and 4, and these pins are also made to enter apertures 38, produced in the guides 17, the apertures being placed in transversely aligned pairs. The spring connection between the heads 31 and the boxes 26 is made in order that the cutters may cut to a proper depth, when, for example, two bundles, one on top of the other, are forced beneath the cutters. The cutter shaft is provided, preferably at its left-hand end, with a small sprocket wheel 39, connected by a chain belt 40 with the sprocket wheel $a^6$ on the driven or line shaft $a^4$.

In the body frame of the attachment, preferably above or upon the bottom sills 15 thereof, a shaft B, is journaled, carrying at its outer end, preferably its left-hand end, a large sprocket wheel 41, secured to the shaft with washer and nut, which is connected by a chain belt 42 with the small sprocket wheel $a^5$ upon the driving shaft; and this belt is ordinarily held taut by a suitable tightener 43, and tighteners 44, are also employed to keep the upper chain belt 40 under proper tension. By securing the wheel 41 to the shaft B in the manner above set forth, the wheel may be readily removed and another of different diameter substituted; thus any desired speed may be given to the conveyer. The shaft B, within the frame, is provided with a toothed drum 45, secured thereon, or instead of the drum two sprocket wheels may be used; and upon the shaft B the side boards $b$ of a conveyer B', are located, the drum 45, being between these boards; the sides of the conveyer are made to extend outwardly some distance beyond the rear end of the main frame, and the side boards of the conveyer are made in two sections 46 and 47, the sections having a hinged connection, so that the outer sections 47 of the side boards, which are the longer sections, may be folded downward practically parallel with the diagonal sills or beams 22 of the frame, as shown in Fig. 4. The side boards of the conveyer have extension sides 48 located thereon and have a removable connection therewith as shown in Fig. 2; and the inner ends of the extension sides are preferably made to fit against the inner sides of the guides 17.

A drum corresponding to the drum 45 and designated as 49, is journaled in adjustable bearings at the outer end of the conveyer, and over the drums the conveyer belt 50, is made to pass, the belt being an endless one, and is preferably made of a series of endless chains connected by angle bars 51 crossing their outer faces, although the construction of the conveyer belt may be varied as practice may demand. The two sections of the conveyer are held in horizontal alignment preferably through the medium of legs 52, pivotally connected with its outer ends, and more or less inclination may be given to the conveyer according to whether the legs are placed diagonally beneath it or perpendicularly. The legs are pivotally attached to studs 53, located upon the outer faces of the side board of the conveyer, and when the conveyer is not needed and is to be folded up out of the way, the legs 52 are removed and the outer section of the conveyer is dropped downward essentially parallel with the diagonal frame beams 22, and the studs 53, are made to enter spring brackets 54, attached to the diagonal beams, as shown in both Figs. 2 and 4.

At a suitable point near the juncture of the sides of the diagonal beams 22 with the horizontal beams or sills 15 of the body frame, boxes are located, in which a shaft C, is journaled. The shaft C, is provided at its right-hand end with a sleeve $c$, the sleeve being loosely mounted upon the shaft, and extending from its left-hand end inward to about the center of the shaft. The sleeve $c$, is provided with two crank arms 55 and 56, which are projected downwardly from it, being curved preferably in direction of the thrasher or separator. This construction of the shaft is best shown in Fig. 5, and the sleeve section of the shaft C, is given a rocking movement by attaching to the outer end of the sleeve a crank arm 61, provided with a longitudinal slot; a pitman 62 being connected with the crank arm 61 and likewise with the small crank disk $a^8$ on the drive shaft, a wrist pin being eccentrically placed upon the said disk, and the pitman being pivotally connected with the wrist pin. The attachment between the lower end of the pitman and the crank arm is an adjustable one in order that more or less throw may be given to the crank arms 55 and 56, and to that end a suitable bolt is passed through the pitman and through the slot of the outer or main crank arm of the sleeve, enabling the pitman to be carried in direction of either end of the slot. At the left-hand end of the shaft C, an actuating crank arm 61, is secured, which crank arm stands directly opposite to the corresponding arm 57 of the sleeve $c$, and the actuating crank arm 61 of the shaft C, is driven by a pitman 59, connected with it and with the chain wheel $a^5$ upon the left-hand end of the drive shaft, the connection between the pitman 59 and the crank arm 57 being an adjustable one, the crank arm 57 being slotted as shown at 58 in Fig. 2. Between its center and its bearings the shaft C, is provided with inner crank arms 63 and 64, best shown in Fig. 5.

The inner crank arms of the crank shaft C and sleeve $c$, are adapted for engagement with and are adapted to impart a longitudinally reciprocating movement to feed boards D. These feed boards have a stepped upper surface, as shown best in Fig. 3, and the boards are two in number and may be properly designated as D and D'. The feed board D at the right-hand side of the machine is actuated from the sleeve $c$, while the feed board D' at the left-hand side of the machine is actuated from the shaft C. Both of the feed boards have free movement over the end of the lip 13 of the concave 12, and the boards are supported at their inner ends only by engagement with the said lip, and therefore the inclination of the boards may be regulated by raising and lowering the lip, the lip being held in any position in which it is placed by passing a rod 65 beneath it and through the body frame of the attachment.

The feed boards comprise a bottom, which is also stepped yet closed, stepped side pieces, and cross bars located at suitable distances apart connecting the sides; thus the grain is delivered in easy stages from the top of the feed boards to the concave when the former are agitated. The feed boards extend below the inner end of the conveyer B', and the left-hand feed boards are connected by links 66 with the sleeve crank arms 55 and 56, the links being connected with the feed board at about the central portion of their under sides, while the right-hand feed board D', is connected by similar links 67 with the shaft crank arms 63 and 64; and by reason of this connection it will be observed that when one feed board is being given an inward throw the other is being given an outward throw.

As has heretofore been stated, the drive wheel $a^2$ is loosely mounted upon the drive shaft, and a driving connection is effected between these two by means of a clutch mechanism E. This mechanism is best shown in Fig. 6, and it consists in a hub $e$, which is connected with the drive shaft yet is free to move longitudinally thereon. In the drawings the connection is shown as effected by passing a pin $e'$ through the hub and through a slot $e^2$ made longitudinally in the drive shaft. Within the drive wheel $a^2$ a second wheel $e^3$ is rigidly fastened to the drive shaft, the periphery of the inner wheel being curved, and clutch arms $e^4$, are made to pass through suitable apertures in the periphery of the inner fixed wheel $e^3$, the clutch arms at their outer ends being provided with heads adapted to engage with the inner peripheral surface of the drive wheel $a^2$; and in order that the clutch arms may be adjusted to or from the tire of the drive wheel the said arms are made in two sections, coupled by a suitable union; and the inner ends of the clutch arms are pivotally connected with the outer face of the hub $e$.

A spring $e^5$, is coiled around the shaft A' in such manner that it will act upon the hub $e$ to normally force it away from the hub of the drive wheel $a^2$, and when the spring so acts the clutch arms are carried out of engagement with the drive wheel and the drive shaft will cease to revolve. The clutch arms, however, are forced to an engagement with the drive wheel to impart movement to it through the medium of a shifting lever 70, one end of which engages with the hub $e$. The lever is fulcrumed preferably upon the upper portion of the thrasher or separator frame 10, and it extends over to the right-hand side of the machine, at which point it is attached to one end of a link 71, the said link being connected at its opposite end to a hand lever 72, the lever being fulcrumed upon the right-hand side of the frame, as shown in Fig. 4. The head of the lever with which the head of the link 71 is connected, is preferably made cylindrical and provided with a notch 73, and this notch is adapted to receive the toe of an angle lever 74, fulcrumed adjacent to the hand lever 72. The angle lever at its upper end has connected with it a rod 75, which slides in a suitable guide attached to the frame. The upper member of the lever with which the rod is connected is held normally in a vertical position by means of a spring 76, whereby its lower member will constantly engage with the hand lever. The free end of the rod 75, is provided with adjusting nuts 77, secured upon it, and the free end of the rod passes through an opening made in a crank arm 78, the crank arm being secured to the right-hand end of a shaft 79, said shaft being journaled in the upper portion of the frame of the attachment, as shown in Figs. 3 and 4. The crank arm 78, has attached to it a second crank arm 80, the two crank arms being so attached as to form an elbow lever. The two arms may be in one casting or they may be separately attached to the shaft. The crank arm 80, is connected with the lower end of a governor rod 81, the governor being of any suitable type, and the said governor is located upon the upper portion of the frame of the attachment near the right-hand side thereof, being actuated by a sprocket wheel 83, the shaft to which it is secured being journaled in a bracket 82, projected from the governor frame; and the said shaft is geared, or otherwise suitably connected with the sleeve by which the governor pawls are rotated, and through which the governor rod 81 passes to its connection with the bell cranks 78 and 79. The sprocket wheel 83 is connected by a chain belt 84 with the small sprocket wheel $a^3$ at the right-hand end of the driven shaft $a^4$. The belt 84 is usually controlled by a suitable tightener 85.

Upon the left-hand end of the shaft 79, as shown in Fig. 2, a crank arm $79^a$, is located, upon which an adjustable weight $79^b$ is placed. The crank arm and weight of this shaft are adapted to counterbalance fingers 86, secured upon the shaft 79. These fingers extend, as shown in Fig. 3, downwardly and inwardly in such manner that when the fingers are dropped their lower ends will be immediately in front of the delivery ends of the feed boards D, and will prevent any material passing from the said boards. All of the gearing may be, and preferably is, covered or cased over with a hood or hoods of tin or of wood in order to prevent the straw from coming in contact with them when in motion.

In the operation of the machine the hand lever 72 is manipulated until the toe of the angle lever 74, enters the notch 73, and by so manipulating this lever the shifting lever 70, is acted upon in such a manner as to force the clutch arms of the clutch device against the driving wheel $a^2$, and cause the wheel to drive the shaft A'. This connection having been effected, when the cylinder shaft of the separator or thrasher is set in motion, motion is also communicated to all the gearing of the attachment through the medium of the driving wheel $a^2$ and the drive shaft A', and as the bundles are fed in upon the conveyer they are carried by the conveyer beneath the cutters, the bands of the bundles are separated, the straw is loosened, and is delivered by the conveyer upon the feed boards, and the feed boards being alternately horizontally reciprocated will by easy gradations deliver the material between the concave and cylinder of the thrasher. As long as a proper speed is maintained the governor arms will act in such a manner as to force the governor rod 81 downward, and consequently will hold the fingers 86 a sufficient distance above the feed boards to be entirely out of the way of the material carried thereby, and at the same time the crank arm 78, connected with the finger shaft 79, will be moved away from the adjusting nuts 77. But in the event the speed should fall below a predetermined degree and thus cause the operative parts to clog the cylinder, or should the speed be slackened for any cause in a manner to render the attachment unsafe to operate, the governor arms will fall, and the crank arms 78 of the finger shaft will be carried against the adjusting nut 77, and will draw the toe of the angle lever 74 out from the hand lever 72, permitting the latter to turn and release the shifting lever 70, whereupon, the spring of the shifting device will act immediately to carry the clutch arms out of engagement with the driving pulley $a^2$; and by stopping the movement of the drive shaft the feed devices will be likewise stopped, and the fingers 86, will drop downward to the position shown in Fig. 3, and prevent any material which may be upon the feed boards from dropping between the concave and cylinder.

Having thus described my invention, I claim as new and desire to secure by Letters Patent—

1. In a band cutting and feeding attachment for thrashers and like machines, the combination, with a conveyer, arched guides located at opposite sides of the conveyer, boxes having sliding movement in the guides, heads likewise having sliding movement in the guides, a spring connection between the heads and the boxes, and means, substantially as described, for anchoring the heads to the guides, of a drum shaft, cables adapted to be attached to said heads and to be wound upon the drum shaft, a cutter shaft journaled in the boxes, and cutters carried by the said shaft, as and for the purpose set forth.

2. In a band cutting and feeding attachment for thrashing and like machines, the combination, with a support, curved and slotted arms secured to the support, the arms being provided with apertures at the side of the slot, boxes held to slide in the slotted portion of the arms, sliding apertured heads located adjacent to the boxes, a spring connection between the boxes and said heads, and pins adapted to enter the apertures in the arms and heads, of a cutter shaft journaled in the boxes, a drum shaft journaled upon a support and provided with ratchets, said ratchets being engaged by detents, and cables having guided movement, connected with the drum shaft and with the heads of the boxes, as and for the purpose set forth.

3. In a band cutting and feeding attachment for thrashing and like machines, the combination, with the driving mechanism, and a feed table driven thereby, of a clutch acted upon by the driving mechanism, a trip lever connected with the clutch, a governor connected with the trip lever and adapted to actuate the same, and fingers also actuated by the governor and located over the delivery end of the feed table, substantially as and for the purpose set forth.

4. In a band cutting and feeding attachment for thrashing machines, the combination, with a conveyer, guides located adjacent to the conveyer, boxes held to travel in the guides, a shaft journaled in said boxes carrying band-cutting knives, and means for raising and lowering the knife shaft, substantially as described, of a driving shaft, a pulley, a driving connection between the said shaft and the knife shaft, a clutch connection between the driving shaft and said pulley, reciprocating feed boards located beneath the conveyer, a driving connection between the drive shaft, the feed boards and the conveyer, a governor, a shaft provided with a series of fingers extending adjacent to the feed boards, an operative connection between the governor and the said shaft to cause the said fingers to approach the feed boards when the speed of the machine decreases and a trip mechanism, substantially as described, connected with the shifting mechanism of the clutch and the governor, as and for the purpose specified.

5. In a band cutting and feeding attachment for thrashing and like machines, the combination with the driving mechanism of the thrasher, of a shaft adapted to be driven therefrom and provided with a driving pulley, a clutch connection between the driving pulley and the driving shaft, a shifting lever connected with the clutch, a governor, a trip connection between the governor and the shifting mechanism of the clutch, feed tables, a driving connection between the driving shaft and the feed tables, whereby the latter are longitudinally reciprocated, and fingers actuated by the governor, adapted to be raised and lowered over the delivery end of the feed table, substantially as shown and described, whereby when the governor turns at a predetermined speed the feed mechanism is stopped and the fingers drop to retard the progress of the material being fed, as and for the purpose set forth.

WILLIAM TAYLOR.

Witnesses:
FRANK A. BROWN,
THOMAS ELSTAB.